United States Patent
Leu et al.

(10) Patent No.: US 7,168,840 B2
(45) Date of Patent: *Jan. 30, 2007

(54) PIEZOELECTRIC LIGHT-EMITTING DIODE AND BACKLIGHT SYSTEM USING THE SAME

(75) Inventors: Charles Leu, Fremont, CA (US);
Tai-Cherng Yu, Tu-Cheng (TW);
Ga-Lane Chen, Fremont, CA (US)

(73) Assignee: Hon Hai Precision Industry Co., Ltd. (TW)

( * ) Notice: Subject to any disclaimer, the term of this patent is extended or adjusted under 35 U.S.C. 154(b) by 73 days.

This patent is subject to a terminal disclaimer.

(21) Appl. No.: 10/972,629

(22) Filed: Oct. 25, 2004

(65) Prior Publication Data
US 2005/0117321 A1    Jun. 2, 2005

(30) Foreign Application Priority Data
Dec. 2, 2003    (TW) ............................... 92133865 A

(51) Int. Cl.
*F21V 7/04* (2006.01)
*F21V 5/00* (2006.01)
*H01J 63/04* (2006.01)

(52) U.S. Cl. ...................... 362/612; 362/326; 313/508
(58) Field of Classification Search ........ 362/612–614, 362/608, 326; 313/508
See application file for complete search history.

(56) References Cited

U.S. PATENT DOCUMENTS

| 5,446,334 | A * | 8/1995 | Gaffney ...................... 310/338 |
| 6,835,440 | B1 * | 12/2004 | Konishi et al. ............. 428/156 |
| 6,976,779 | B2 * | 12/2005 | Ohtsuki et al. ............. 362/608 |
| 6,979,095 | B2 * | 12/2005 | Min et al. ................... 362/611 |
| 7,059,728 | B2 * | 6/2006 | Alasaarela et al. ........... 353/94 |
| 7,078,856 | B2 * | 7/2006 | Fujii .......................... 313/508 |
| 2005/0036319 | A1 * | 2/2005 | Gruhike et al. ............. 362/311 |
| 2005/0140258 | A1 * | 6/2005 | Leu et al. .................... 313/110 |

* cited by examiner

*Primary Examiner*—Sandra O'Shea
*Assistant Examiner*—David Makiya
(74) *Attorney, Agent, or Firm*—Morris Manning & Martin LLP; Tim Tingkang Xia, Esq.

(57) ABSTRACT

A light-emitting diode (LED) (110) includes a chip body (113), an encapsulation can (115) surrounding the chip body, and a base (111) supporting the encapsulation can and the chip body thereon. A diffraction grating (117) is provided at a surface of the encapsulation can, and the encapsulation can is made of a piezoelectric material for widening radiation angles of light beams emitted from the chip body. With the diffraction grating and the piezoelectric encapsulation can, light beams from the chip body are diffracted and attain wider radiation angles. A backlight system (100) includes a light guide plate (120), and a number of the above-described LEDs disposed adjacent to the light guide plate. Light beams having wide radiation angles are emitted from the LEDs and enter the light guide plate. This enables a light-emitting surface (122) of the light guide plate to have highly uniform brightness.

17 Claims, 2 Drawing Sheets

PIEZOELECTRIC LIGHT-EMITTING DIODE AND BACKLIGHT SYSTEM USING THE SAME

CROSS-REFERENCE TO RELATED APPLICATIONS

This application is related to one copending U.S. patent application, namely application Ser. No. 10/951,845 entitled "PIEZOELECTRIC LIGHT-EMITTING DIODE AND BACKLIGHT SYSTEM USING THE SAME", filed an Sep. 27, 2004 with the same assignee as the instant application. The disclosure of the above-identified application is incorporated herein by reference.

BACKGROUND OF THE INVENTION

1. Field of the Invention

The present invention relates to light-emitting diodes (LEDs), and especially to an LED used in a backlight system for a device such as a liquid crystal display.

2. Description of the Prior Art

Liquid crystal displays are commonly used as the display device for compact electronic apparatuses, because they not only display good quality images using little power but also are very thin. However, the liquid crystals in a liquid crystal display do not emit any light themselves. The liquid crystals have to be lit up by a light source so as to clearly and sharply display text and images. Typically, LEDs are used as the light source because of their high luminance and low loss.

Referring to FIG. 4, a conventional LED 1 includes a base 16, a chip body 13 mounted on the base 16, and an encapsulation can 15 sealing the chip body 13. In general, the encapsulation can 15 is made of a transparent or translucent epoxy resin, and a maximum radiation angle of the LED 1 is 120°.

FIG. 5 shows a backlight system 60, comprising three of the LEDs 1 and a light guide plate 2. Light paths within the light guide plate 2 are also shown. Light beams 3 are projected from the LEDs 1 to an incident surface (not labeled) of the light guide plate 2. The light guide plate 2 redirects the light beams, which then emit from an emitting surface (not labeled) of the light guide plate 2. However, because each of the LEDs 1 emits light beams with a maximum radiation angle of 120°, resulting light beams 3 within the light guide plate 2 yield a plurality of dark areas 23 corresponding to gaps between adjacent LEDs 1 and corners of the light guide plate 2. The dark areas 23 prevent the backlight system 60 from providing uniform illumination.

Therefore, it is desired to provide an LED and a backlight system using the same which overcome the above-described disadvantages of the prior art.

SUMMARY OF THE INVENTION

An object of the present invention is to provide an LED which has a large radiation angle.

Another object of the present invention is to provide a backlight system yielding uniform illumination derived from light beams originally emitted from one or more LEDs having large radiation angles.

According to a first aspect of the present invention, there is provided an LED comprising a chip body, an encapsulation can surrounding the chip body, and a base supporting the encapsulation can and the chip body thereon. A diffraction grating is provided at a surface of the encapsulation can, and the encapsulation can is made of a piezoelectric material for widening radiation angles of light beams emitted from the chip body.

According to a second aspect of the present invention, there is provided a backlight system comprising a light guide plate, and a plurality of LEDs according to the above-described LED. The LEDs are disposed adjacent to the light guide plate. Light beams having wide radiation angles are emitted from the LEDs and enter the light guide plate. This enables a light-emitting surface of the light guide plate to have highly uniform brightness without any dark areas.

Other objects, advantages, and novel features of the present invention will be apparent from the following detailed description of preferred embodiments thereof with reference to the attached drawings.

DETAILED DESCRIPTION OF THE PRESENT INVENTION

Figure 1:
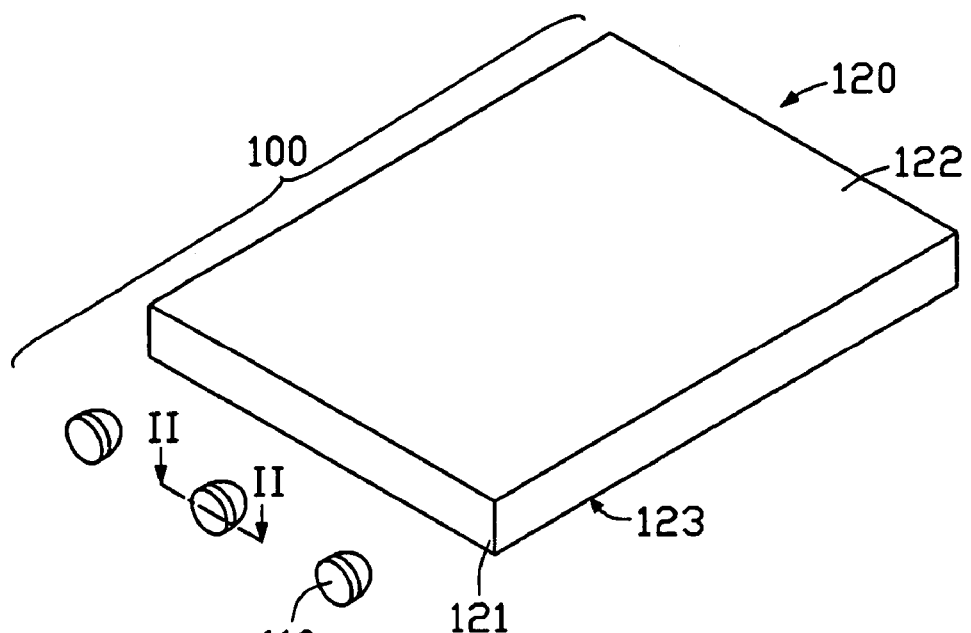
FIG. 1 is an isometric view of a backlight system in accordance with the present invention, the backlight system including three LEDs.

Referring to FIG. 1, a backlight system 100 in accordance with a preferred embodiment of the present invention includes a light guide plate 120 and a plurality of LEDs 110. The LEDs 110 provide light beams to the light guide plate 120, which redirects the light beams. Thus the light guide plate 120 functions to convert a series of point light sources into a uniform surface light source.

The light guide plate 120 is made of a transparent material such as acrylic resin, polycarbonate resin, polyvinyl chloride, or glass. The light guide plate 120 is a rectangular sheet of uniform thickness, or alternatively may be generally cuneiform. The light guide plate 120 includes a light incident surface 121, a light-emitting surface 122 connected with the light incident surface 121, and a bottom surface 123 opposite to the emitting surface. The light incident surface 121 of the light guide plate 20 receives light beams from the LEDs 10. The light-emitting surface 122 of the light guide plate 20 is flat, and the bottom surface 123 of the light guide plate 20 can be formed with a plurality of dots (not shown). The dots improve the uniformity of illumination of the light guide plate 120.

Figure 2:
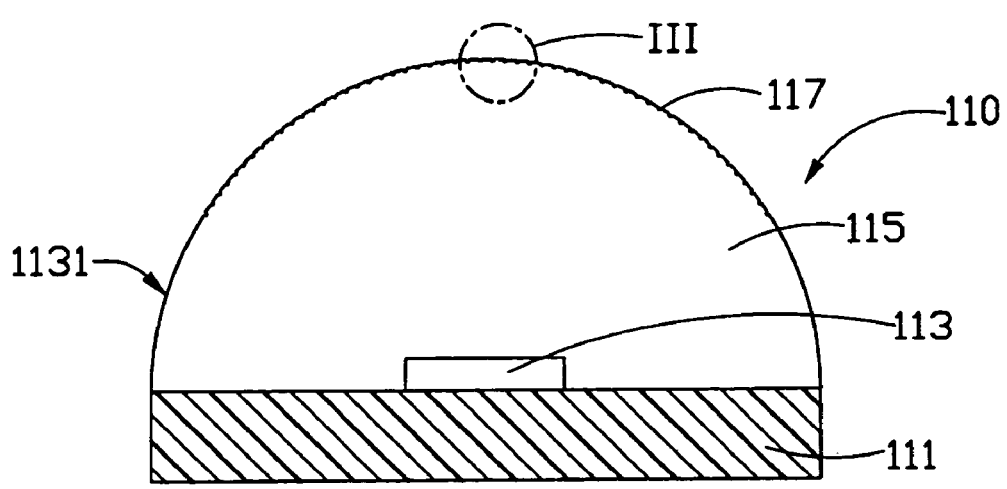
FIG. 2 is an enlarged, schematic cross-sectional view of one of the LEDs of FIG. 1, taken along line II—II thereof.

Referring to FIGS. 1 and 2, the LEDs 110 are positioned adjacent to the light incident surface 121. Each LED 110 includes a base 111, a chip body 113 fixed on the base 111, and an encapsulation can 115 covering the chip body 113.

The encapsulation can 115 is made of a transparent piezoelectric material, such as a transparent piezoelectric ceramic. For example, the encapsulation can 115 can comprise polyvinylidene fluoride and a piezoelectric ceramic. The encapsulation can 105 is connected to an electrical controlling circuit (not shown), to control deformation of the encapsulation can 115. Because the encapsulation can 115 is made of the piezoelectric material, which has the characteristic of electromechanical coupling, the encapsulation can 115 is induced to mechanically deform when an electric field is applied. When the controlling circuit is operated so that an electric field is applied on the encapsulation can 105, the dipole moment of the piezoelectric material of the encapsulation can 105 extends along the direction of the electric field.

A hemispherical light exit surface 1131 of the encapsulation can 115 functions as a lens. A diffraction grating 117 is provided on the light exit surface 1131. The diffraction grating 117 covers an entire area of the light exit surface 1131 which receives light from the chip body 113. The diffraction grating 117 may be provided by way of an optical film being coated on the light exit surface 1131, the optical film having a plurality of diffraction grating structures.

Figure 3:
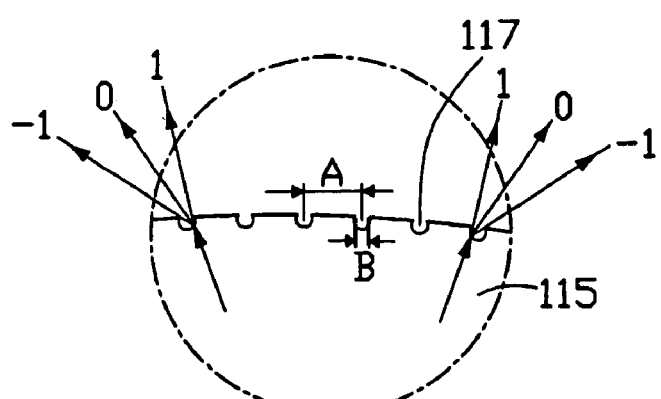
FIG. 3 is an enlarged view of a circled portion III of FIG. 2, showing essential optical paths of light beams passing through a diffraction grating.
Figure 4:
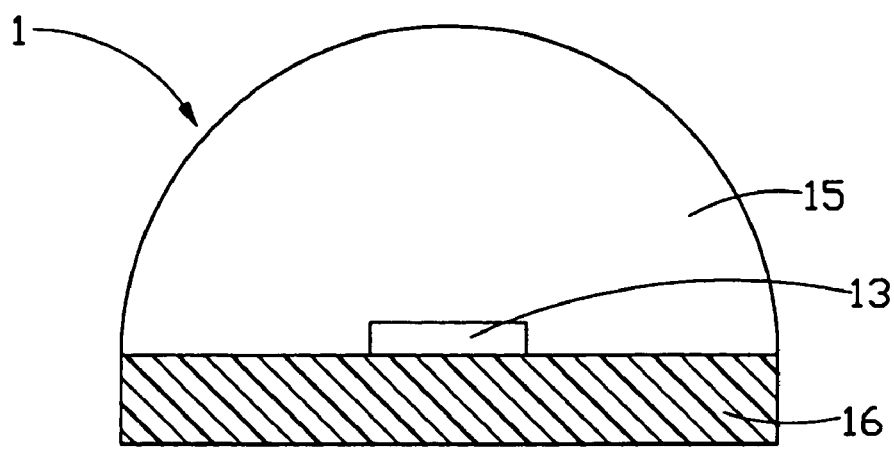
FIG. 4 is a schematic, cross-sectional view of a conventional LED.
Figure 5:
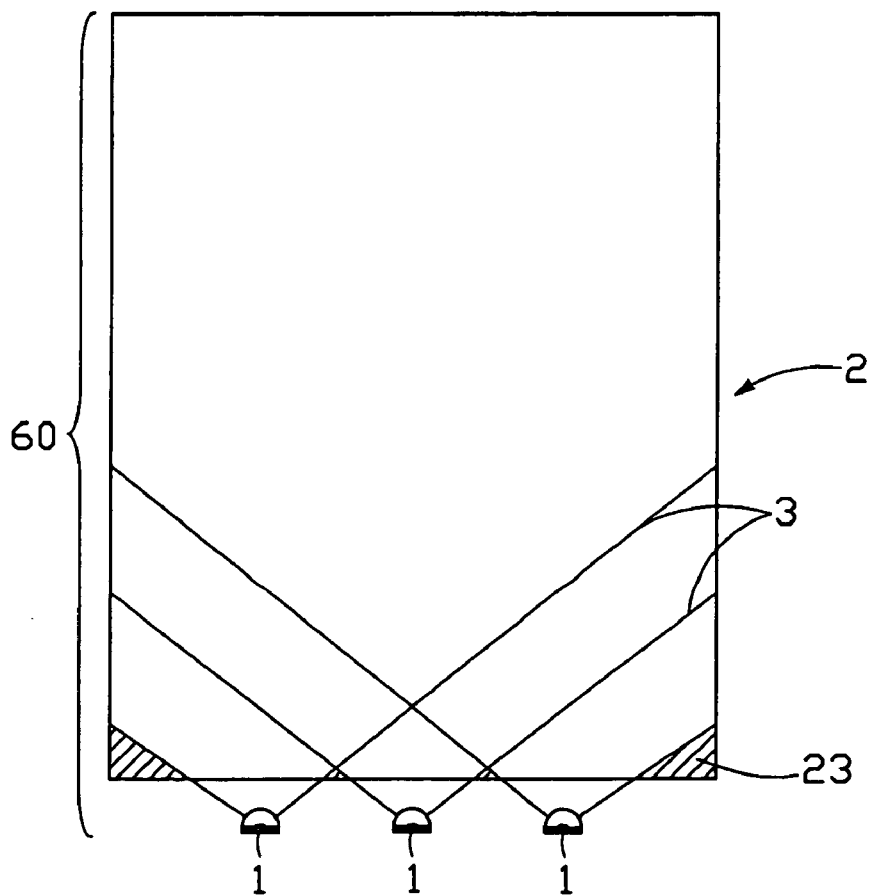
FIG. 5 is a schematic, cross-sectional view of a backlight system comprising three of the LEDs of FIG. 4 and a light guide plate, showing light paths from the LEDs to the light guide plate and within the light guide plate.

FIG. 3 is an enlarged view of a circled portion III of FIG. 2, and shows essential optical paths of light beams passing through the diffraction grating 117. A pitch between each two adjacent lines of the diffraction grating 117 is defined as A, and a width of each line of the diffraction grating 117 is defined as B. A is in the range from 10 μm to 30 μm. B is in the range from 1 μm to 10 μm.

When an electric field (not shown) is applied on the encapsulation can 105, the encapsulation can 105 is induced to deform. A and B of the diffraction grating 117 vary according to the voltage used to generate the electric field. In particular, B increases with increasing voltage. In such case, more light beams can pass through the lines.

When light beams emitted from the chip body 113 pass through the diffraction grating 117, a diffraction effect is produced. The following describes a characteristic of the distribution of light intensity due to the diffraction effect. One light beam is split into many light beams by passing through the diffraction grating 117. That is, the light beam is split into ±1st order beams, ±2nd order beams (not shown), ±3rd order beams (not shown) through to ±nth order beams (not shown), with these split beams being respectively distributed at opposite sides of a zeroth order beam. The combination of the zeroth order beams, the ±1st order beams, the ±2nd order beams through to the ±nth order beams enlarges the radiation angle of the LED 110. This improves the uniformity of illumination provided by the backlight system 100.

In summary, by providing the diffraction grating 117 an the encapsulation can 115, light beams emitted from the chip body 113 are diffracted. Further, the encapsulation can 115 can be induced to deform by application of an electric field, thereby controlling widening of the radiation angle of the LED 110. This improves the uniformity of illumination provided by the backlight system 100.

Many modifications and variations are possible within the ambit of the invention herein. For example, the diffraction grating 117 may be divided into several diffraction gratings, each diffraction grating including many lines. These diffraction gratings can be provided on the light exit surface 1131 continuously. Alternatively, each two adjacent diffraction gratings can be separated a predetermined distance. The backlight system 100 may further include a diffusion sheet and a prism sheet. All such and other modifications and variations that may be apparent to a person of ordinary skill in the art are intended to be within the scope of the present invention.

It is to be further understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A light-emitting diode comprising:
    a base;
    a chip body fixed on the base for emitting light beams; and
    an encapsulation can covering the chip body;
    wherein at least one diffraction grating is provided at a surface of the encapsulation can, and the encapsulation can is made of a piezoelectric material such that radiation angles of light beams passing through said diffraction grating out of the encapsulation can are widened.

2. The light-emitting diode as claimed in claim 1, wherein said diffraction grating is an optical film with a plurality of diffraction grating structures.

3. The light-emitting diode as claimed in claim 1, wherein a width of each of lines of said diffraction grating is in the range from 1 to 10 μm, and a pitch between each two adjacent lines is in the range from 10 to 30 μm.

4. The light-emitting diode as claimed in claim 1, wherein said diffraction grating is a plurality of diffraction gratings.

5. The light-emitting diode as claimed in claim 4, wherein the plurality of diffraction gratings are provided at the surface of the encapsulation can continuously.

6. The light-emitting diode as claimed in claim 4, wherein each two adjacent diffraction gratings are separated a predetermined distance.

7. The light-emitting diode as claimed in claim 1, wherein the encapsulation can comprises polyvinylidene fluoride and a piezoelectric ceramic.

8. A backlight system comprising:
    at least one light-emitting diode comprising a base, a chip body mounted on the base for emitting light beams, and an encapsulation can covering the chip body, wherein at least one diffraction grating is provided at a surface of the encapsulation can, and the encapsulation can is made of a piezoelectric material such that radiation angles of light beams passing through said diffraction grating out of the encapsulation can are widened; and
    a light guide plate comprising a light incident surface adjacent to said diffraction grating in order to receive light beams therefrom, and a light exit surface.

9. The backlight system as claimed in claim 8, wherein said diffraction grating is an optical film with a plurality of diffraction grating structures.

10. The backlight system as claimed in claim 8, wherein a width of each of lines of said diffraction grating is in the range from 1 to 10μm, and a pitch between each two adjacent lines is in the range from 1 to 30 μm.

11. The backlight system as claimed in claim 8, wherein said diffraction grating is a plurality of diffraction gratings.

12. The backlight system as claimed in claim 11, wherein the plurality of diffraction gratings are provided at the surface of the encapsulation can continuously.

13. The backlight system as claimed in claim 11, wherein each two adjacent diffraction gratings are separated a predetermined distance.

14. The backlight system as claimed in claim 8, wherein the encapsulation can comprises polyvinylidene fluoride and a piezoelectric ceramic.

15. A backlight system comprising:
    a light source;
    a light guide member comprising a light incident surface facing said light source so as to allow light from said light source passable through said incident surface into said light guide member for transmission of said light guide member; and a diffraction grating interferingly formed between said light source and said incident surface of said light guide member and formed at an exit surface of said light source to diffract said light from said light source before said light reaches said light incident surface of said light guide member, said exit surface of said light source is a stretchable surface in case of electrification.

16. The backlight system as claimed in claim 15, wherein at least two of said diffraction gratings are formed parallel to each other at said exit surface with a predetermined interval therebetween.

17. The backlight system as claimed in claim 15, wherein said diffraction grating is widened at said exit surface of said light source when said exit surface is electrified to stretch.

* * * * *